United States Patent
Vashisth et al.

(10) Patent No.: US 12,042,954 B2
(45) Date of Patent: Jul. 23, 2024

(54) B-STAGING OF PRE-PREG USING CAPACITIVELY-COUPLED ELECTROMAGNETIC HEATING METHOD

(71) Applicant: The Texas A&M University System, College Station, TX (US)

(72) Inventors: Aniruddh Vashisth, College Station, TX (US); Micah J. Green, College Station, TX (US)

(73) Assignee: The Texas A&M University System, College Station, TX (US)

( * ) Notice: Subject to any disclaimer, the term of this patent is extended or adjusted under 35 U.S.C. 154(b) by 763 days.

(21) Appl. No.: 16/870,739

(22) Filed: May 8, 2020

(65) Prior Publication Data

US 2020/0354531 A1  Nov. 12, 2020

Related U.S. Application Data

(60) Provisional application No. 62/846,644, filed on May 11, 2019.

(51) Int. Cl.
| | |
|---|---|
| *B29B 13/08* | (2006.01) |
| *B29B 11/16* | (2006.01) |
| *B29C 70/50* | (2006.01) |
| *C08J 3/24* | (2006.01) |
| *C08J 3/28* | (2006.01) |
| *C08J 5/24* | (2006.01) |
| *B29C 35/08* | (2006.01) |

(Continued)

(52) U.S. Cl.
CPC .............. *B29B 13/08* (2013.01); *B29B 11/16* (2013.01); *B29C 70/50* (2013.01); *B29C 70/502* (2013.01); *B29C 70/504* (2013.01); *C08J 3/247* (2013.01); *C08J 3/28* (2013.01); *C08J 5/243* (2021.05); *B01J 2208/00469* (2013.01); *B29C 2035/0855* (2013.01); *B29C 2035/0861* (2013.01); *C08J 5/244* (2021.05); *C08J 5/246* (2021.05); *C08J 2363/00* (2013.01); *H05B 6/46* (2013.01); *H05B 6/60* (2013.01)

(58) Field of Classification Search
CPC ..... B29C 70/50; B29C 70/502; B29C 70/504; B29C 2035/0855
USPC .......................................... 219/698, 700, 678
See application file for complete search history.

(56) References Cited

U.S. PATENT DOCUMENTS

| | | | | |
|---|---|---|---|---|
| 2,788,838 | A | * | 4/1957 | Crabbe .................. B29C 70/504 264/134 |
| 3,558,840 | A | * | 1/1971 | Dunn ..................... H05B 6/788 219/696 |

(Continued)

OTHER PUBLICATIONS

Voss, WA Geoffrey. "Industrial Microwave Applications." Sep. 10, 1974 4th European Microwave Conference. IEEE, 1974. (Year: 1974).*

(Continued)

*Primary Examiner* — Benjamin A Schiffman
(74) *Attorney, Agent, or Firm* — Winstead PC

(57) ABSTRACT

A method of fabrication processing a pre-preg material includes applying electromagnetic heating to a composition including a fiber and a resin. The electromagnetic heating is conducted with at least one fringing field capacitor utilizing radio frequency (RF) alternating current (AC) and controlling cross-linking of the resin in the composition via the electromagnetic heating.

18 Claims, 16 Drawing Sheets

(51) Int. Cl.
*H05B 6/46* (2006.01)
*H05B 6/60* (2006.01)

(56) References Cited

U.S. PATENT DOCUMENTS

| | | | | |
|---|---|---|---|---|
| 4,456,498 | A * | 6/1984 | Churchland | B29C 66/836 219/699 |
| 4,476,073 | A * | 10/1984 | Ashcraft | B32B 27/32 26/72 |
| 4,522,875 | A * | 6/1985 | Still, Jr. | B29B 15/127 428/419 |
| 5,169,571 | A * | 12/1992 | Buckley | B29C 35/0888 425/371 |
| 5,217,656 | A * | 6/1993 | Buckley | B29C 66/61 264/495 |
| 5,228,947 | A * | 7/1993 | Churchland | B27N 3/143 156/583.1 |
| 5,487,853 | A * | 1/1996 | Buckley | B29C 66/112 264/261 |
| 5,589,260 | A * | 12/1996 | Ben Zvi | B29C 43/22 264/172.19 |
| 5,662,761 | A * | 9/1997 | Middelman | B32B 37/226 428/209 |
| 6,054,696 | A * | 4/2000 | Lewis | H05B 6/686 219/696 |
| 6,657,173 | B2 * | 12/2003 | Flugstad | A23B 9/04 219/771 |
| 6,914,226 | B2 * | 7/2005 | Ottaway | A23L 3/185 426/244 |
| 7,226,518 | B2 * | 6/2007 | Loubinoux | D04H 3/04 156/181 |
| 10,059,036 | B2 * | 8/2018 | Backhaus | B05D 1/40 |
| 2002/0017033 | A1 * | 2/2002 | Wefers | F26B 5/048 34/264 |
| 2011/0163480 | A1 * | 7/2011 | Herkner | B29C 35/0805 425/470 |
| 2012/0077398 | A1 * | 3/2012 | Gaillard | D06M 10/003 264/460 |
| 2016/0325491 | A1 * | 11/2016 | Sweeney | B29C 64/106 |
| 2020/0317957 | A1 * | 10/2020 | Sweeney | C09J 11/04 |

OTHER PUBLICATIONS

Regier, M., and H. Schubert. "Microwave processing." Thermal technologies in food processing (Apr. 24, 2001): 178-207. Chapter 10 (Year: 2001).*

Vashisth, Aniruddh, et al. "Continuous processing of pre-pregs using radio frequency heating." Composites Science and Technology 195 (Apr. 28, 2020): 108211. (Year: 2020).*

Ritter, Lawrence C. Conveyorized Radio Frequency Cure of Epoxy Glass Composites. Boeing Vertol Co Philadelphia PA, May 1, 1980. (Year: 1980).*

Alazard, Patrick, and Albert Gourdenne. "Radiofrequency (27.12 MHz) activation of the curing reaction of epoxy resins of DGEBA type." Macromolecular Symposia. vol. 122. No. 1. Basel: Hüthig & Wepf Verlag, Aug. 1997. (Year: 1997).*

Radio-Frequency Heating in Food Processing: Principles and Applications. pp. 107-109. United States, CRC Press, Dec. 4, 2014. (Year: 2014).*

* cited by examiner

B-STAGING OF PRE-PREG USING CAPACITIVELY-COUPLED ELECTROMAGNETIC HEATING METHOD

CROSS-REFERENCES TO RELATED APPLICATIONS

This application claims the benefit of priority to and incorporates by reference the entire disclosure of U.S. Provisional Patent Application No. 62/846,644 filed on May 11, 2019.

STATEMENT REGARDING FEDERALLY SPONSORED RESEARCH

This invention was made with government support under CMMI-1561988 awarded by the National Science Foundation. The government has certain rights in the invention.

BACKGROUND

This section provides background information to facilitate a better understanding of the various aspects of the disclosure. It should be understood that the statements in this section of this document are to be read in this light, and not as admissions of prior art.

Industrial grade fiber composites are manufactured by assembling pre-preg, that is pre-impregnated, fibers in a mold with appropriate geometries. Pre-pregs usually contain stiff fibers, such as, but not limited to, carbon, glass, aramid, and the like, embedded in a partially cured polymer matrix, such as a thermoset or thermoplastic. Currently, pre-pregs are B-staged using ovens, where temperature is carefully controlled to get a specific degree of crosslinking. This method, however, can lead to several problems that result in the production of inferior pre-pregs.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, a method of fabrication processing a pre-preg material is described, where the method includes applying electromagnetic heating to a composition including a fiber and a resin, where the electromagnetic heating is conducted with at least one fringing field capacitor utilizing radio frequency (RF) alternating current (AC) and controlling cross-linking of the resin in the composition via the electromagnetic heating.

In another embodiment, a method of fabrication processing a pre-preg material is described, where the method includes applying electromagnetic heating to a composition including a carbonaceous solid inclusion and a resin, where the electromagnetic heating is conducted with at least one fringing field capacitor utilizing radio frequency (RF) alternating current (AC) and controlling cross-linking of the resin in the composition via the electromagnetic heating.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

Figure 1A:
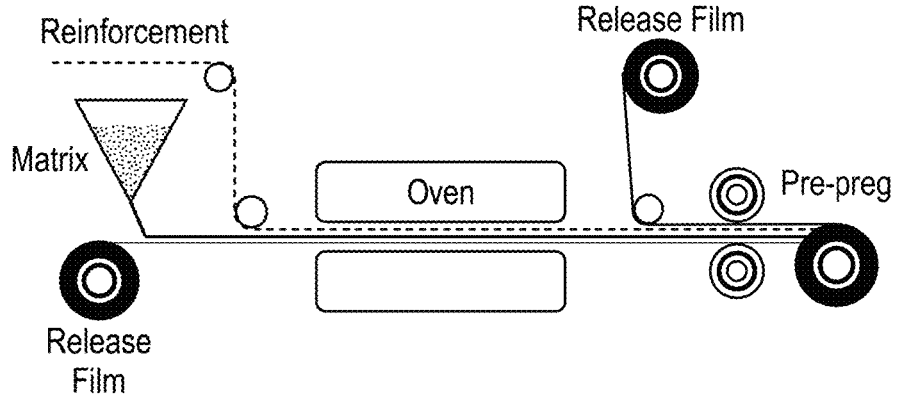
FIG. 1A illustrates a solution route method of pre-preg fabrication.

It is to be understood that the following disclosure provides many different embodiments, or examples, for implementing different features of various embodiments. Specific examples of components and arrangements are described below to simplify the disclosure. These are, of course, merely examples of potential applications and are not intended to be limiting. The section headings used herein are for organizational purposes and are not to be construed as limiting the subject matter described.

The present disclosure pertains to methods of controllably cross-linking thermosets, with or without secondary fillers, using localized electromagnetic heating of the primary fibers, or embedded secondary fillers, in the pre-preg stage. In some aspects of the present disclosure, radio frequency (RF) alternating current (AC), typically in the kHz to MHz range (20 kHz-300 MHz), using one or multiple fringing field capacitors is used to establish a strong electric field through the pre-preg. For example, electromagnetic heating in the radio frequency (RF) regime of carbonaceous composites with carbon fibers, carbon nanofibers, carbon nanotubes, carbon black pre-impregnated (prep-preg) with a thermosetting matrix is discussed. The present disclosure demonstrates the flexibility of RF-based heating approach to achieve variable level of crosslinking in thermoset matrix pre-pregs. Two types of pre-pregs are demonstrated herein, continuous carbon fiber impregnated with thermoset resin and carbon nanotubes dispersed in matrix.

The methods of the present disclosure generally target, but are not limited to, aerospace, automotive, marine, civil engineering, sports equipment industries, and the like that rely on using lightweight fiber composites for body part fabrication. Pre-preg allows easy impregnation of primary fibers in matrix of flat workable surfaces that can be used in a later industrial process to make complex shapes which could be problematic for a hot injection process. Pre-preg also allows engineers to impregnate a bulk amount of fiber and then store it in a cooled area for an extended period of time to cure later. The process can also be time consuming in comparison to the hot injection process and the added value for pre-preg preparation is at the stage of the material supplier. There are various advantages of using pre-pregs, such as; fabrication of composites with complex geometries without significant flaws, faster composite fabrication. In recent years, advanced fiber composites manufactured with nanofillers have shown enhanced performance.

Currently, pre-pregs are B-staged using ovens, where temperature is carefully controlled to get a specific degree of crosslinking. The degree of B-staging affects the flow during lamination of composites. For example, if the amount of B-staging is too low, the resin flows excessively, thereby resulting in an inferior final composite. Alternatively, if the B-staging is too high, the pre-preg will not have adequate flow during lamination, resulting in delamination and poor adhesion of the pre-preg while fabricating composites.

Figure 1B:
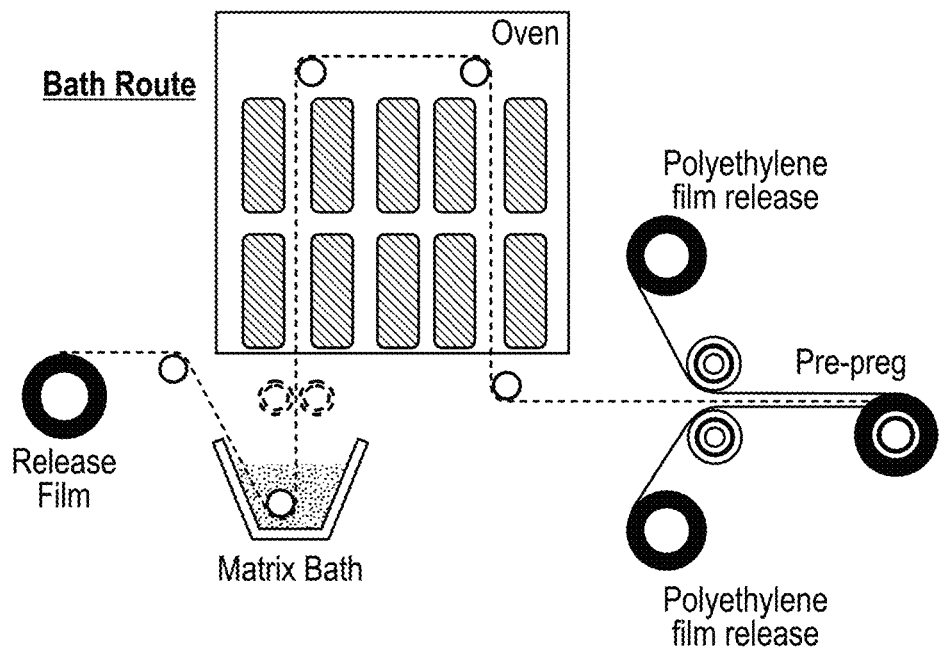
FIG. 1B illustrates a bath route method of pre-preg fabrication.

FIG. 1A illustrates a pre-preg formation using a solution route method. According to this method, high viscosity resins are diluted to reduce the viscosity. The fibers are then impregnated with the diluted resin with decreased viscosity that aids better flow of resin between individual fibers. The heat from the oven is then used to remove the diluting agent and/or partially cure the epoxy (i.e., partial cross-linking in the thermosetting matrices to allow easy handling at later stages of composite fabrication). FIG. 1B illustrates a pre-preg formation using a bath route method. This method is used for lower viscosity resins with viscosity low that can impregnate between individual fibers. Fibers are impregnated with a resin in the matrix bath and consolidated through multiple rollers to remove voids and then passed through an oven where the fiber/epoxy is partially cured according to potential application. As illustrated in FIG. 1A and FIG. 1B, current technologies of making pre-pregs include a solution route geared towards high viscosity resins and a bath route for low viscosity or diluted thermosetting resins.

Figure 2A:
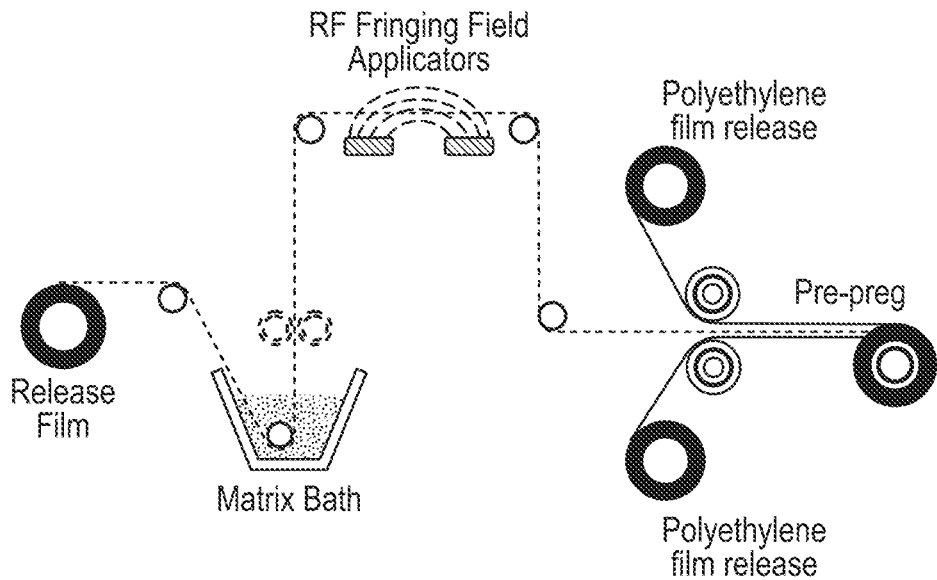
FIG. 2A and FIG. 2B illustrate a method of heating a carbon fiber/epoxy composite via an electric field.
Figure 2B:
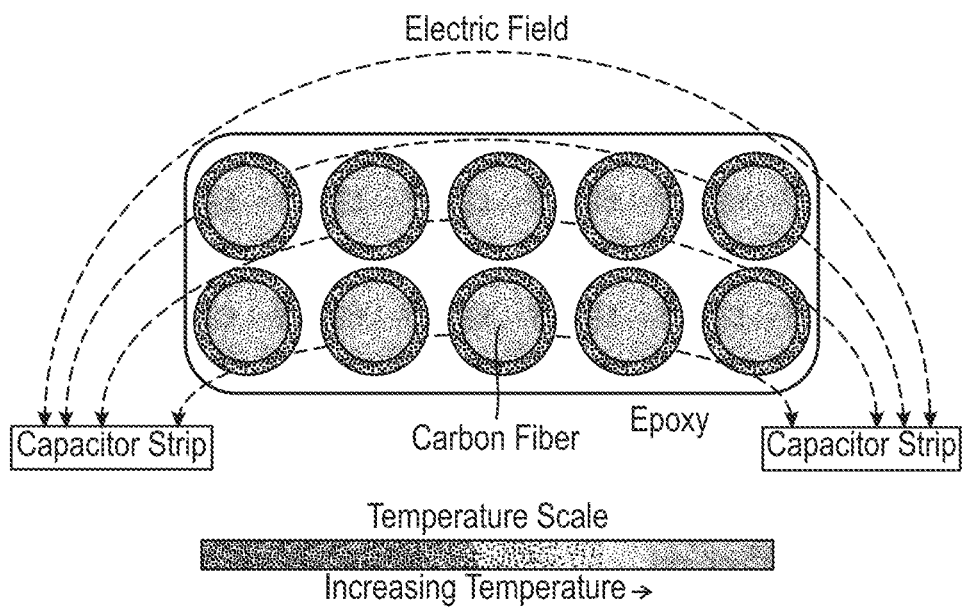

FIGS. 2A and 2B illustrate an aspect of the manufacturing process of the instant disclosure. FIG. 2A is an overview of the process and FIG. 2B illustrates a cross-section of fiber-epoxy composite and illustrates a method of heating a carbon fiber/epoxy composite via an electric field according to an aspect of the present disclosure. As illustrated in FIG. 2, a fringing field capacitor is used to establish a strong electric field through the fiber/epoxy composite to heat and/or partially cure the thermosetting matrix. Carbon nanomaterials are known to heat in response to electromagnetic fields because of their remarkable electrical properties. On a larger scale, polymer/filler composites will also heat, depending on their dielectric properties. The key is that the impedance of the sample will allow power to be dissipated as heat; this is dependent on the sample properties, RF applicator, and frequency. According to the modern theory of polarization, the presence of time-harmonic electromagnetic fields inside a homogeneous matter results in electric polarization due to mechanisms such as dipole, ionic, and electronic polarizations. These various mechanisms result in heat dissipation due to frictional forces caused by molecular movement and electrons collisions.

Figure 3A:
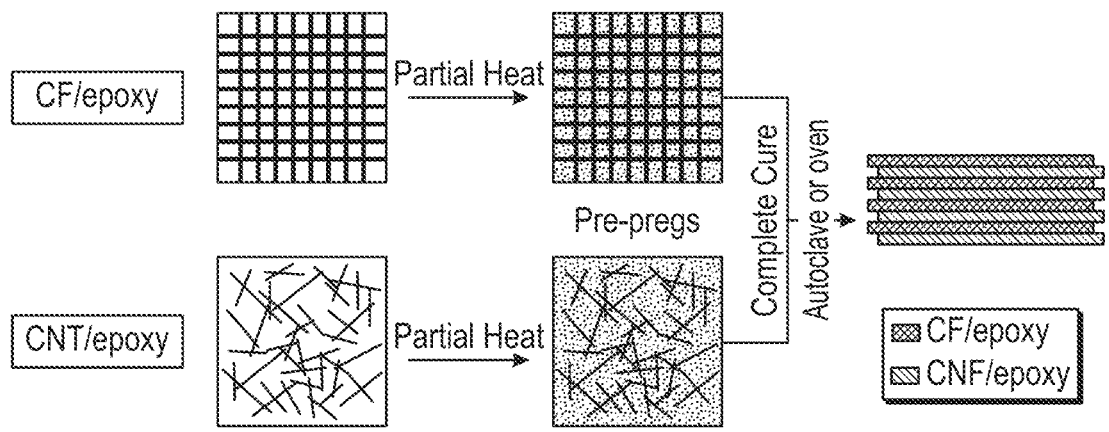
FIG. 3A illustrates a fiber composite fabrication method using pre-pregs.
Figure 3B:
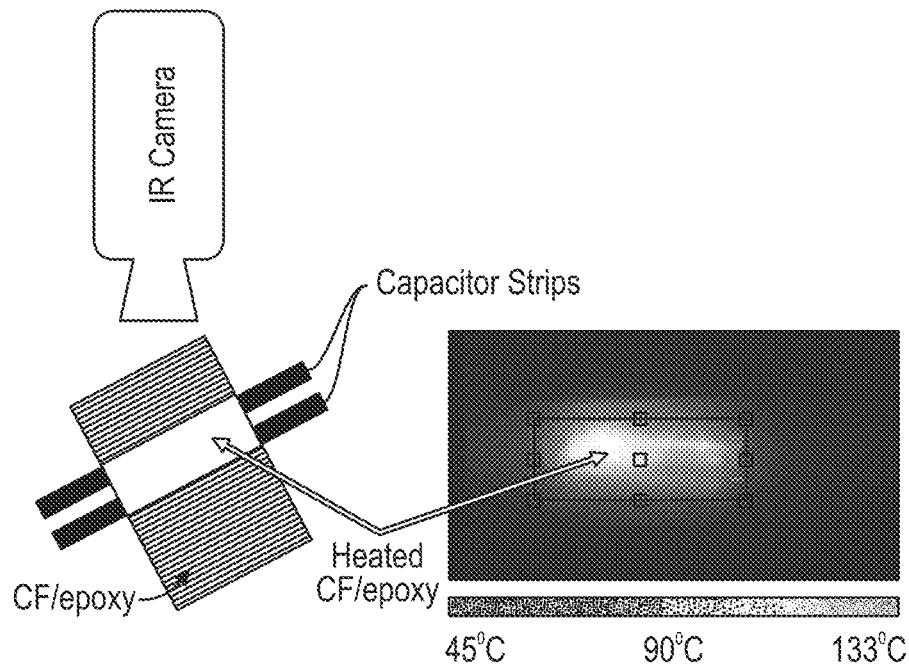
FIG. 3B illustrates a radio frequency (RF) setup with parallel plate capacitors, a forward-looking infrared radar (FLIR), and a fiber composite.

FIG. 3A illustrates a fiber composite fabrication method using pre-pregs. The initial assessment of the composites was carried out by calculating the rate of change in temperature as a function of frequency. FIG. 3B illustrates an RF a system for capturing temperature versus time data. The system of FIG. 3B includes parallel plate capacitors, a forward-looking infrared radar (FLIR) camera, and a fiber composite. Raw temperature versus time data was recorded using the FLIR camera and is illustrated in FIGS. 11-14. These temperature versus time graphs were used to calculate the rate of change in temperature for a particular frequency when RF waves were used to stimulate the specimen. All the specimens have frequency-dependent heating rates with well-defined resonant modes in the range of 40-100 MHz. When maximum heating rates are achieved at a particular frequency, the impedance of the RF source (50Ω) is nearly matched to the impedance of the specimen, applicator, and the connecting cables. This impedance matching leads to efficient coupling between RF energy and the pre-preg specimens. It is also possible to induce higher heating rates in the specimens by using an impedance matching network and a fixed operating frequency that is within the defined industrial ISM bands.

Figure 3C:
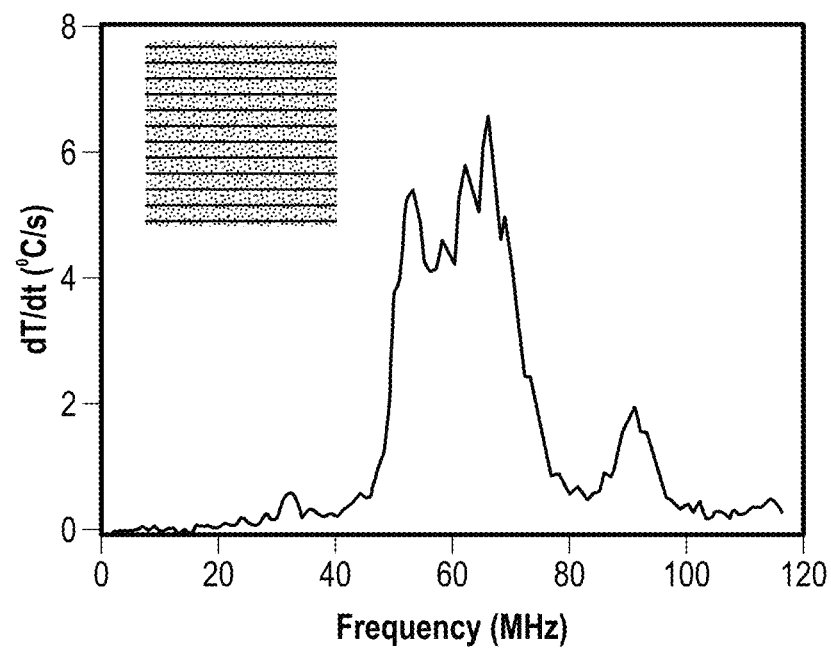
FIG. 3C, FIG. 3D and FIG. 3E illustrate frequency sweeps to find the best frequency to operate electromagnetic heating.
Figure 3D:
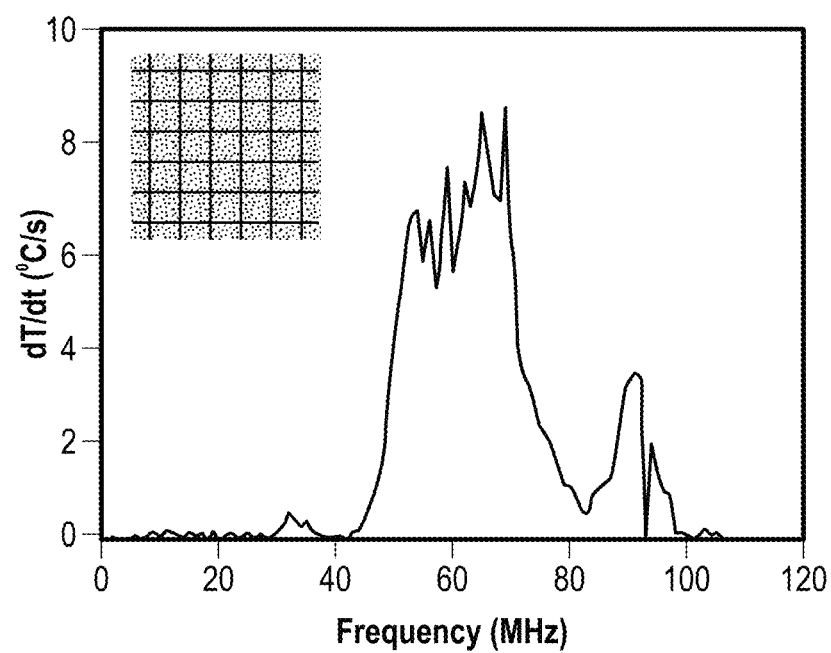
Figure 3E:
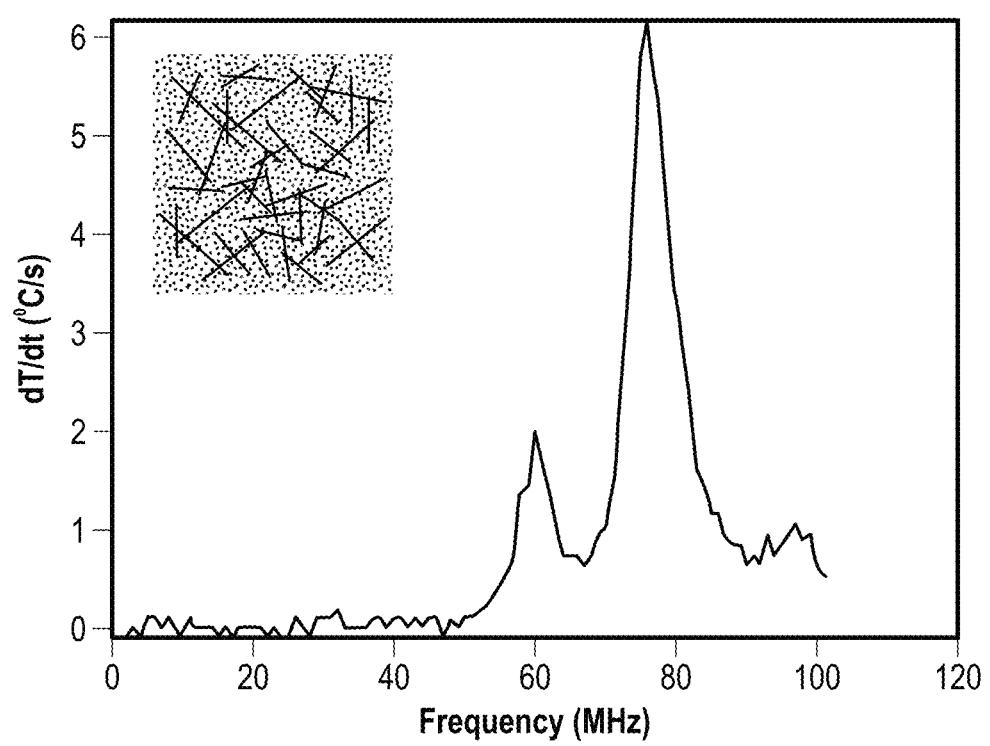

FIG. 3C illustrates a frequency sweep for a specimen having carbon fibers oriented parallel to the parallel plate capacitors. In this orientation, the rate of heating (dT/dt) for carbon fiber/epoxy pre-preg composite ranged from ~0.1° C./s up to 6.5° C./s at 5 W of input power. This is calculated by examining the increase in temperature over a fixed time period at different frequencies. The best frequency depends on various factors such as geometry of specimen and dielectric properties of the material. FIG. 3D illustrates a frequency sweep for a specimen having carbon fibers oriented in a plain weave. In this orientation, heating rates as high as 8° C./s were observed. FIG. 3E illustrates a frequency sweep for a specimen comprising CNT/epoxy composite. For this specimen, heating rates up to 6° C./s were observed at 5 W of input RF power.

The heating rates observed in FIGS. 3C-3E are remarkable and difficult to achieve in any conventional oven. FIGS. 3C-3E show the heating rates for unidirectional CF/epoxy, plain weave CF/epoxy, and CNT/epoxy pre-pregs and the frequencies that provide the highest heating rates are 66 MHz, 71 MHz, and 79 MHz respectively. As mentioned earlier, these heating rates are influenced by the applicator geometry, and the specimen properties. Although fiber volume fractions were kept approximately constant for the unidirectional CF/epoxy and plain weave CF/epoxy specimens, a much higher heating rate was observed for the plain weave. Multiple factors could affect the heating rate of the composite; these include electrical conductivity, thermal conductivity, heat capacity and behavior of medium (isotropic or anisotropic). The electrical conductivity of single T700 and IM7 carbon fiber (longitudinally) is 625 S/cm and 667 S/cm, respectively. The thermal conductivity conductivities for T700 and IM7 carbon fiber (longitudinally) are 9.6 W/(m K) and 5.4 W/(m K), respectively. It should also be noted that T700 pre-pregs have a layup of [0] while IM7 pre-pregs have [0/90] layup, and the orientation of fibers relative to the field would also influence the heating rates.

Using an RF applicator, targeted elements can be heated to appropriate temperatures while avoiding heat transfer limitations and costly custom tooling, such as, for example, conveyor belts running through large convection ovens (as illustrated in FIG. 1A and FIG. 1B). Additionally, in contrast to using oven-style convection heating methods which require heating materials from the outside, RF heating methods utilize volumetric heating, evenly distributing heat to the materials, which results in faster heating and manufacturing of pre-pregs. In some embodiments, this allows for quickly changing the pre-preg composition in manufacturing by utilizing the same equipment, but adjusting the RF frequency, resulting in faster turnaround of the new pre-preg composition.

Figure 4A:
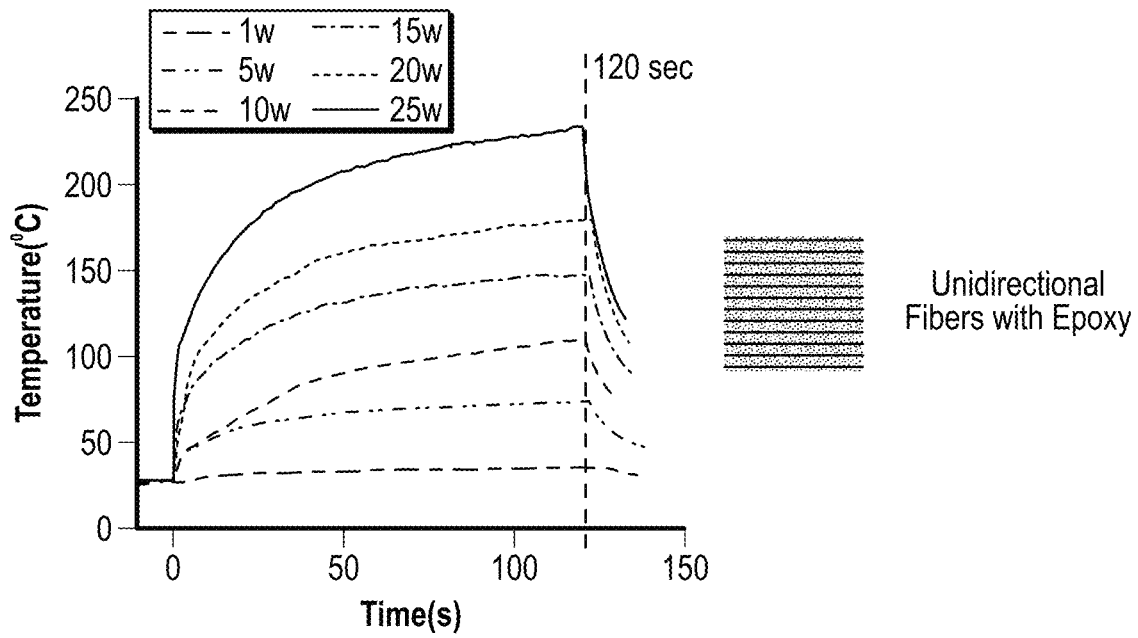
FIG. 4A illustrates varying temperature through variable input power for carbon fiber-epoxy composite with unidirectional fibers.
Figure 4B:
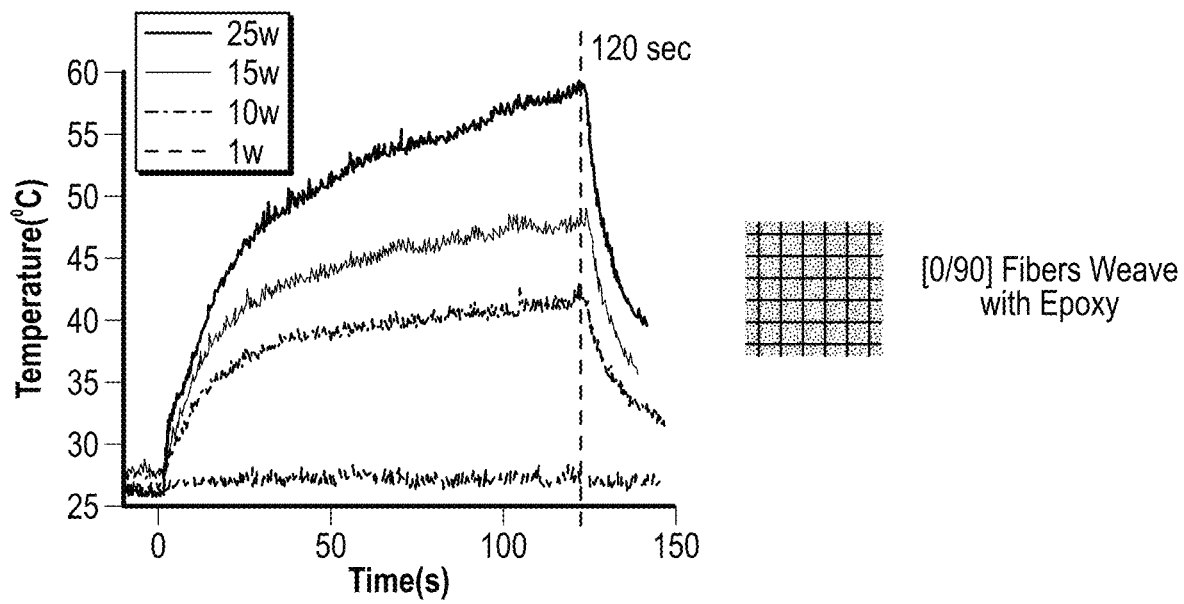
FIG. 4B illustrates varying temperature through variable input power for carbon fiber-epoxy composite with [0/90] fiber weave.
Figure 4C:
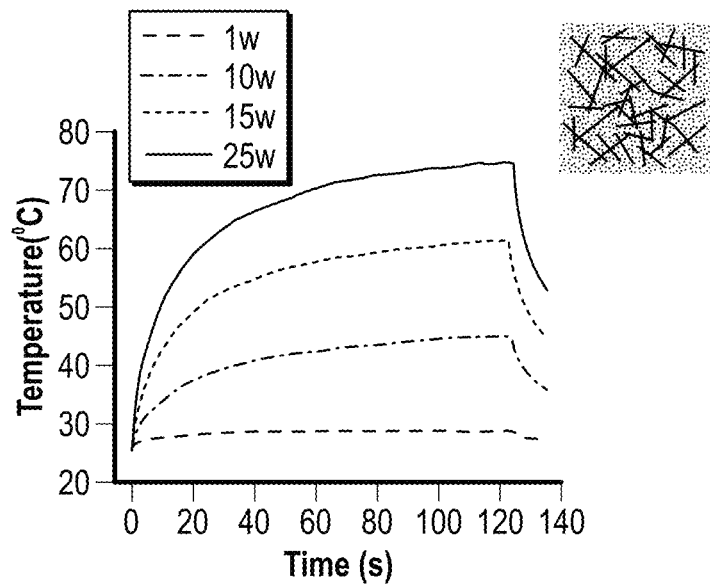
FIG. 4C illustrates varying temperature through variable input power for carbon nanotubes-epoxy composite.
Figure 4D:
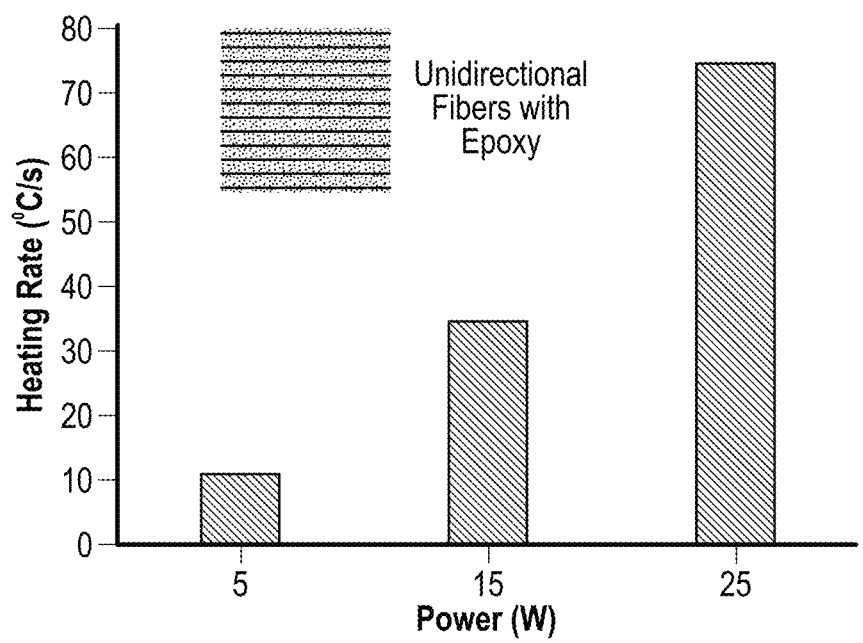
FIG. 4D illustrates heating rate as a function of power.

Next, the thermal response of unidirectional CF/epoxy pre-preg composites were measured over a 120-second heating window at a fixed frequency of 66 MHz. FIG. 4A illustrates varying temperature through variable input power for carbon fiber-epoxy composite with unidirectional fibers. As expected, CF/epoxy composites reach higher temperatures when using higher RF power. An almost negligible thermal response is observed at 1 W, whereas temperatures as high as 230° C. were attained at a power of 25 W. Intuitively, the maximum temperature reached is proportional to the power supplied to the fringing field applicator. FIG. 4B illustrates varying temperature through variable input power for carbon fiber-epoxy composite with [0/90] fiber weave. As shown in FIG. 4A and FIG. 4B, rapid heating and quick cooling of fiber-epoxy composites can be achieved with the RF-aided heating methods of the present disclosure. Similarly, FIG. 4C illustrates the thermal response of CNT/epoxy pre-pregs using variable powers and keeping the frequency constant at 66 MHz. Again, the temperature profile increases monotonically with power, and a temperature plateau is reached as the system reaches thermal equilibrium. FIG. 4D illustrates that a higher rate of heating the composite was achieved by increasing input power. FIGS. 3A-3E and 4A-4D together illustrate the degree of tailoring of the RF process in terms of rapid heating rates that can be achieved by changing RF frequency and input powers. The effect of specimen size was also examined by heating unidirectional CF/epoxy pre-pregs and found fairly uniform heating in the specimens.

Previous methods for fabrication and B-staging of pre-pregs involve ovens programmed to heat specimens in order to activate hardeners and/or latent catalyst to start chemical reactions, for example, crosslinking in two-part thermosets. This method requires large ovens, such as, open convection ovens with conveyor belts, to move pre-pregs. This in turn requires large amounts of energy to heat pre-pregs up to required temperatures. Also the heating is outside-to-inside, that is, the surrounding air heats up the composite from outside to inside. This outside-to-inside heating requires more energy and is usually slow. Whereas RF heating is inside-to-outside, where the RF susceptor (carbon fibers or carbonaceous nanomaterials in this case) heat the material from inside. RF-aided heating of pre-pregs of the present disclosure would reduce the energy cost as this method requires less energy and provides a wide variance for crosslink tailorability in the thermoset. In some embodiments, the pre-preg can also be B-Staged with polytetrafluoroethylene taping, such as, for example, TEFLON® taping, on both sides. With the ever-increasing pre-preg demands in the aerospace and automobile industry, energy requirements would scale proportionally. The methods of the present disclosure aid in better utilization of energy required for B-Staging per unit of pre-preg.

The application of RF-aided heating methods, as disclosed herein, to B-stage pre-pregs provides an opportunity for significant cost cutting in carbon fiber composite fabrication. This is significant, as carbon fiber composite fabrication is expected to reach more than 110 thousand tons produced by 2020. Additionally, the RF-aided heating methods, as disclosed herein, reduce overall costs of pre-preg fabrication, reduce the required footprint of machinery, and provide higher mobility than conventional methods as no convection oven is required. Moreover, capacitively-coupled electromagnetic heating methods, as disclosed herein, not only result in energy savings, but further provide the ability to tailor the curing percentage, which in turn is a function of temperature of the target pre-pregs. Furthermore, rapid curing or partial curing of pre-pregs can also be achieved, reducing the time of pre-preg fabrication.

Additionally, as no convection oven is needed for the pre-preg fabrication methods disclosed herein, many other advantages can be realized. For example, the amount of pre-preg fabrication can be increased and the speed of fabrication can be increased. Desired heating ramp rates can be achieved as long as the thermoset is not damaged or thermally shocked. Faster heating of pre-pregs can help reduce time-related costs for fabrication. Additionally, temperature control is more efficient, for example, rapid cooling and little temperature variation occurs with RF-aided heating as opposed to conventional oven heating.

The system of the instant disclosure has the ability to partially crosslink the filler/epoxy pre-pregs to a desired degree of cure; this parallels conventional oven processing of B-staging pre-pregs, where a given oven temperature and time is correlated with a given degree of cure. Similar control over B-staging can be carried out for unidirectional CF/epoxy pre-pregs using RF energy. In testing, four temperatures were targeted (50° C., 100° C., 150° C. and 200°

Figure 5A:
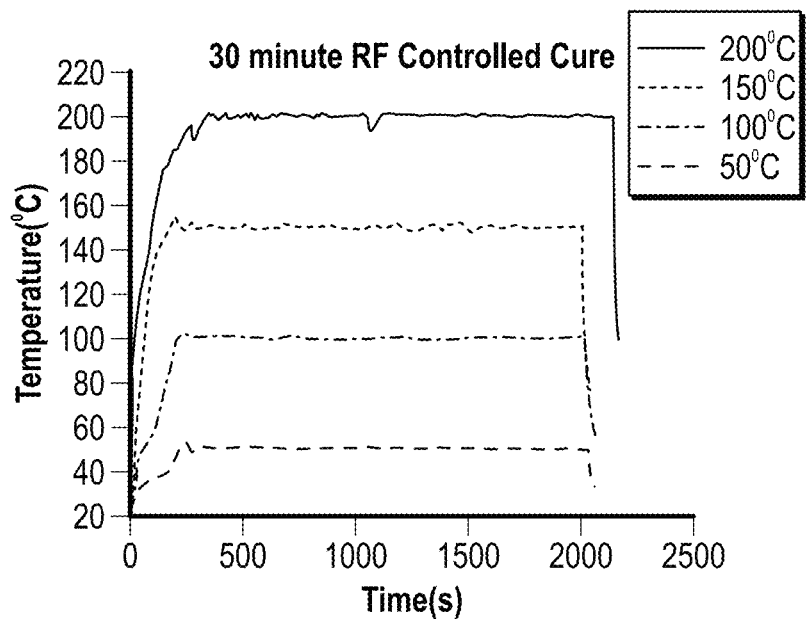
FIG. 5A illustrates a temperature profile of unidirectional carbon fiber/epoxy composite with different target temperatures.
Figure 5B:
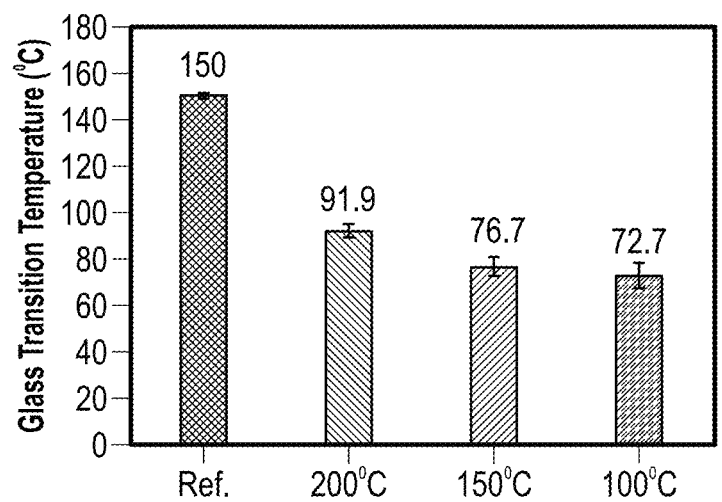
FIG. 5B illustrates glass transition temperature of RF-cured carbon fiber/epoxy and epoxy specimens cured for 1 h at 121° C. and 3.5 h at 177° C.
Figure 5C:
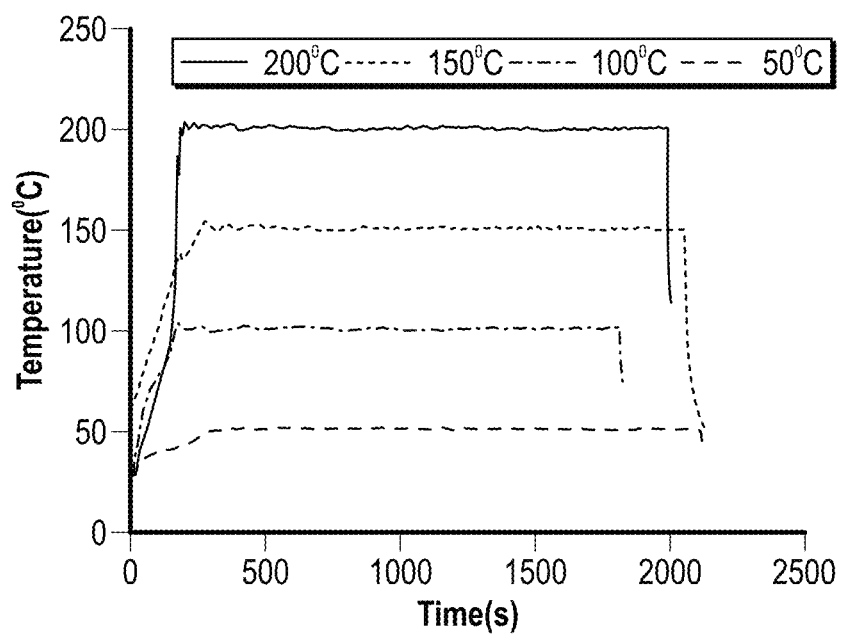
FIG. 5C illustrates temperature as a function of time.
Figure 5D:
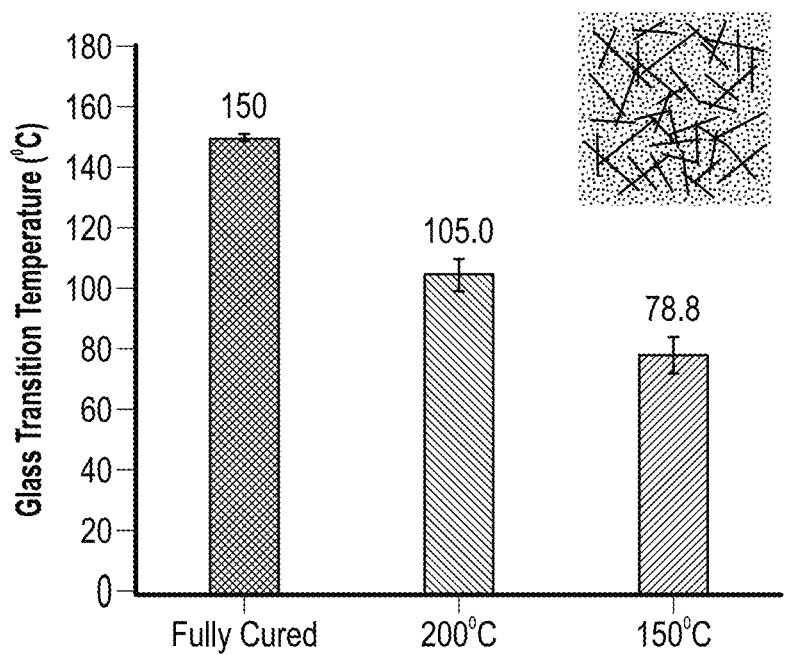
FIG. 5D illustrates glass transition temperatures for carbon nanotubes-epoxy composite.

C.), and these temperatures were held for ~30 minutes (1,800 seconds); the RF power was modulated to maintain these target temperatures. These specimens were then kept in a freezer until DSC measurements were carried out to measure the $T_g$ of the composite. FIG. 5A and FIG. 5B illustrate controlled temperature using RF-aided heating according to aspects of the present disclosure. FIG. 5A illustrates a temperature profile of unidirectional carbon fiber/epoxy composite with different target temperatures. FIG. 5B illustrates glass transition temperature of RF-cured carbon fiber/epoxy and epoxy specimens cured for 1 hour at 121° C. and 3.5 hours at 177° C. As illustrated in FIGS. 5A and 5B, temperature control using RF-aided heating is superior to temperature control in conventional oven-type pre-preg manufacturing methods. As expected, the $T_g$ of the specimen is well correlated with the temperature of the system. These measurements also confirm that the specimens were not completely cured since the $T_g$ of completely cured bisF/DETDA epoxy specimen is between 130-150° C. Similar experiments were carried out on CNT/epoxy composites to show the versatility of the RF partial curing process to apply to other composite types (see FIGS. 5C and 5D). CNT/epoxy nanocomposites with approximately 1 mm thickness were fabricated using a doctor blade on a glass slide. These nanocomposites were partially cured using RF energy by keeping the temperature at a fixed number. This was done by manually controlling the input power of RF for approximately 30 minutes. The specimens were then used for DSC analysis and a similar profile was observed with increasing $T_g$ for specimens kept at higher temperatures.

Figure 6A:
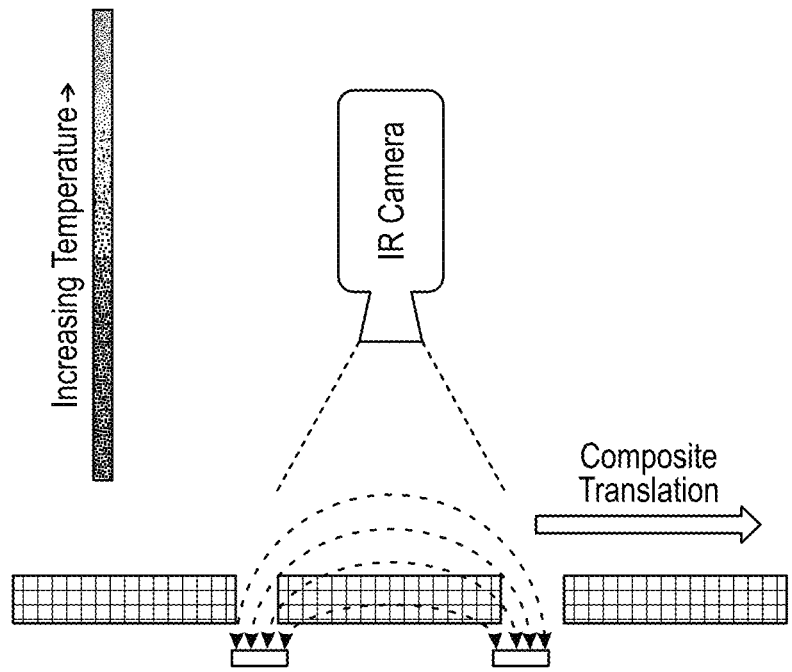
FIG. 6A is a schematic illustration of a setup with plain weave CF/epoxy translating over a fringing field capacitor.
Figure 6B:
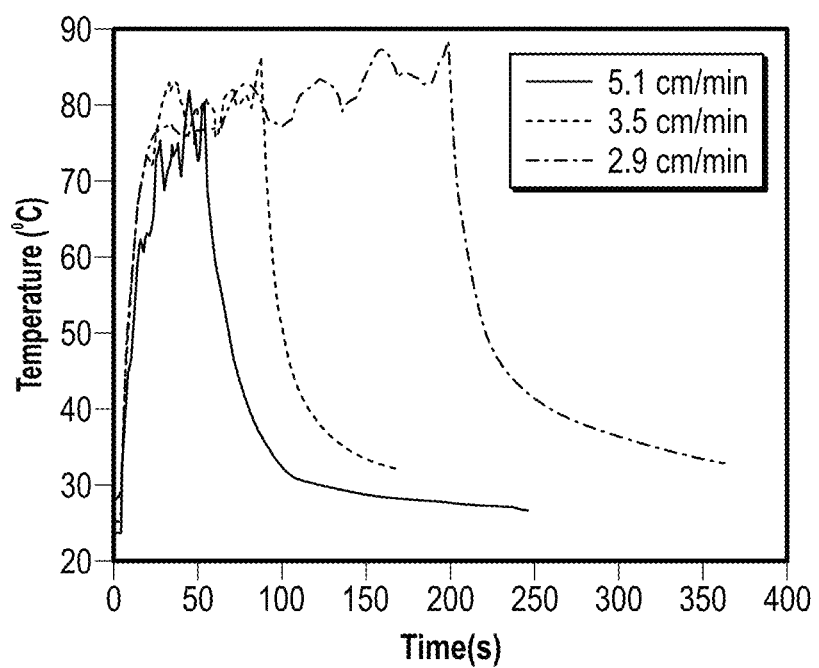
FIG. 6B illustrates temperature verses time of fiber extrusion translating over the parallel plate capacitor at variable speeds and with varying input power applied.

In some embodiments, the ability to better control temperature can result in better extrusion of pre-pregs. FIG. 6A illustrates a fiber extrusion over a parallel plate capacitor which represents the continuous processing that would be utilized in the case of large manufacturing facilities. FIG. 6B illustrates temperature verses time of fiber weave mat scanning translating over the parallel plate capacitor at variable speeds. The temperatures can further be controlled by changing the wattages applied to the capacitor.

Figure 10A:
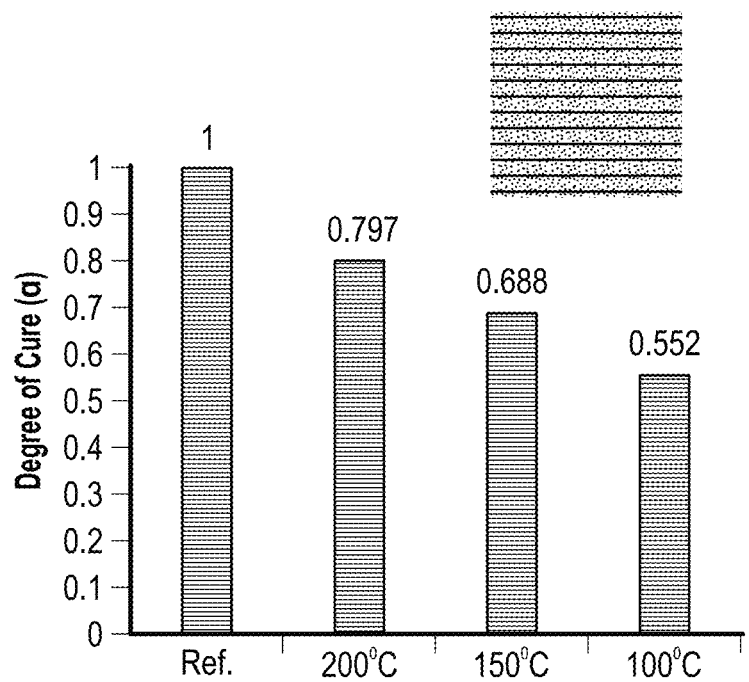
FIG. 10A illustrates degree of cure measure for unidirectional carbon fiber-epoxy prepregs cured at 100° C., 150° C., 200° C. for 30 minutes using RF fields.
Figure 10B:
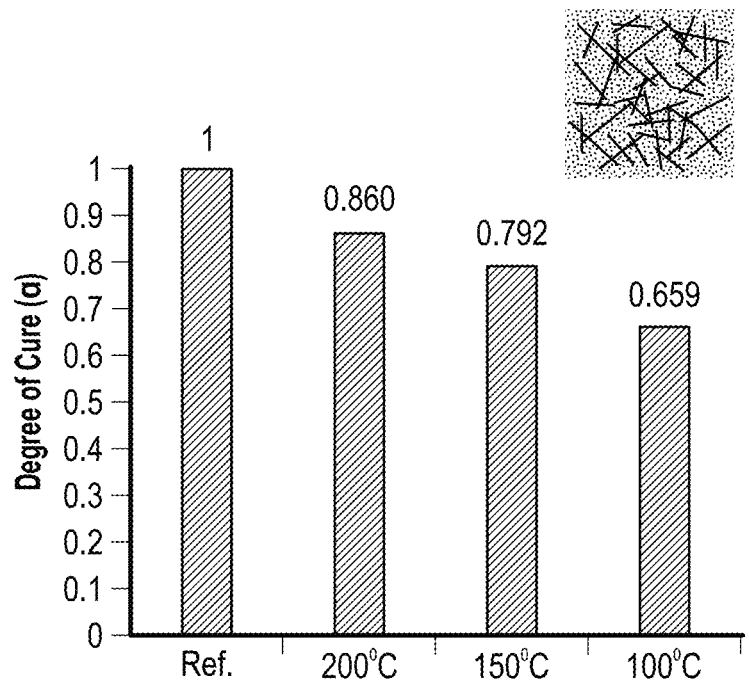
FIG. 10B illustrates degree of cure measure for CNT-epoxy prepregs cured at 100° C., 150° C., 200° C. for 30 minutes using RF fields.
Figure 15A:
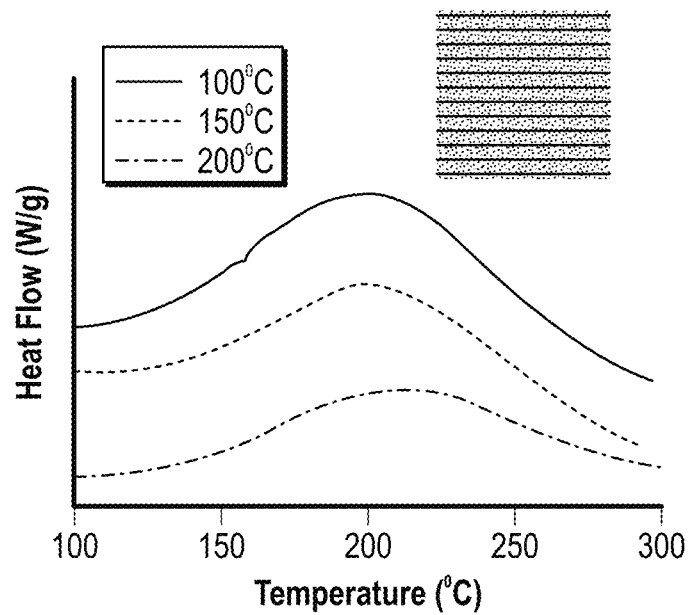
FIG. 15A illustrates a heat flow curve used for calculating the degree of cure for unidirectional carbon fiber-epoxy prepregs cured at 100° C., 150° C., and 200° C. for 30 minutes using RF fields.
Figure 15B:
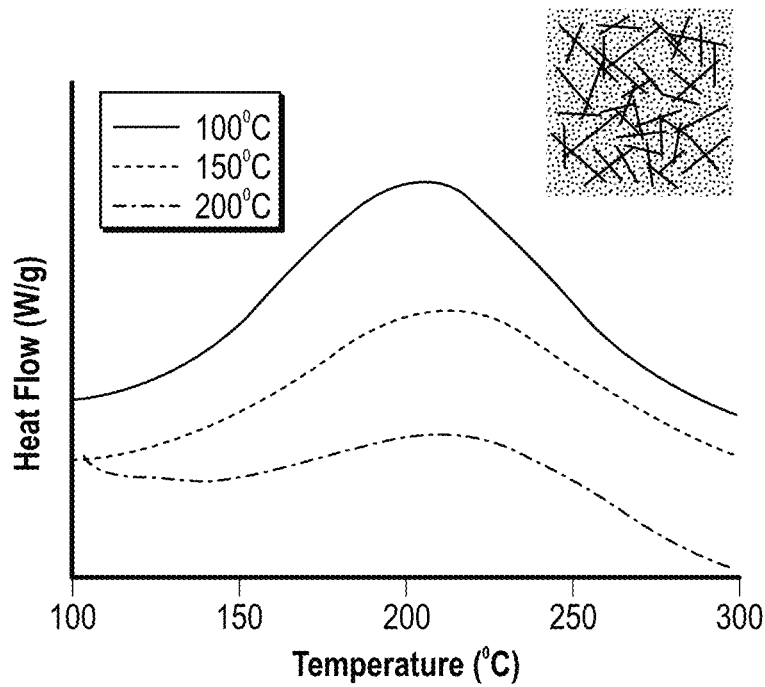
FIG. 15B illustrates a heat flow curve used for calculating the degree of cure for CNT-epoxy prepregs cured at 100° C., 150° C., and 200° C. for 30 minutes using RF fields.

The degree of cure (a) for unidirectional and CNT pre-pregs was also calculated to further quantify the extent of crosslinking in the composites. The specimens were kept at 100° C., 150° C., and 200° C. for 30 minutes and were evaluated for degree of cure. As shown in FIGS. 10A and 10B, the degree of cure increased with higher processing temperatures for both types of composites. These experiments complement the $T_g$ results shown in FIGS. 5A-5D, where increasing $T_g$ corresponds to a higher degree of cure. Curing enthalpies of 387.4 J/g and 341 J/g was used for CNT pre-pregs and CF pre-pregs was used to calculate the degree of cure. FIGS. 15A and 15B illustrate heat flow curves used for calculating the degree of cure for unidirectional carbon fiber-epoxy prepregs and CNT-epoxy prepregs, respectively, cured at 100° C., 150° C., and 200° C. for 30 minutes using RF fields.

Next, the continuous processing method was examined to heat pre-pregs by translating over fringing field RF applicators. For these experiments, 1000 mm×1000 mm sized, plain weave CF/epoxy composite samples were used. These experiments are carried out to mimic continuous processing where the residence time can be controlled by the translation speed of the plain weave. As shown in FIG. 6A, the plain weave CF/epoxy passes over the fringing field, is heated and partially cured in the process to form B-Staged pre-preg. The plain weave CF/epoxy specimens were translated at three different speeds (see FIG. 6B) while the FLIR camera recorded the temperature of the composite over the region above the applicator strips only. As the residence time over the applicator increases, the temperature of the pre-preg also increases. The experiments illustrated in FIG. 6B were carried out at 10 W, while higher temperatures can be attained by using higher input RF power. This experiment shows the versatility to partially cure carbon fiber pre-pregs using RF applicators, and also proves the potential applicability for roll-to-roll processing of pre-pregs.

Figure 8:
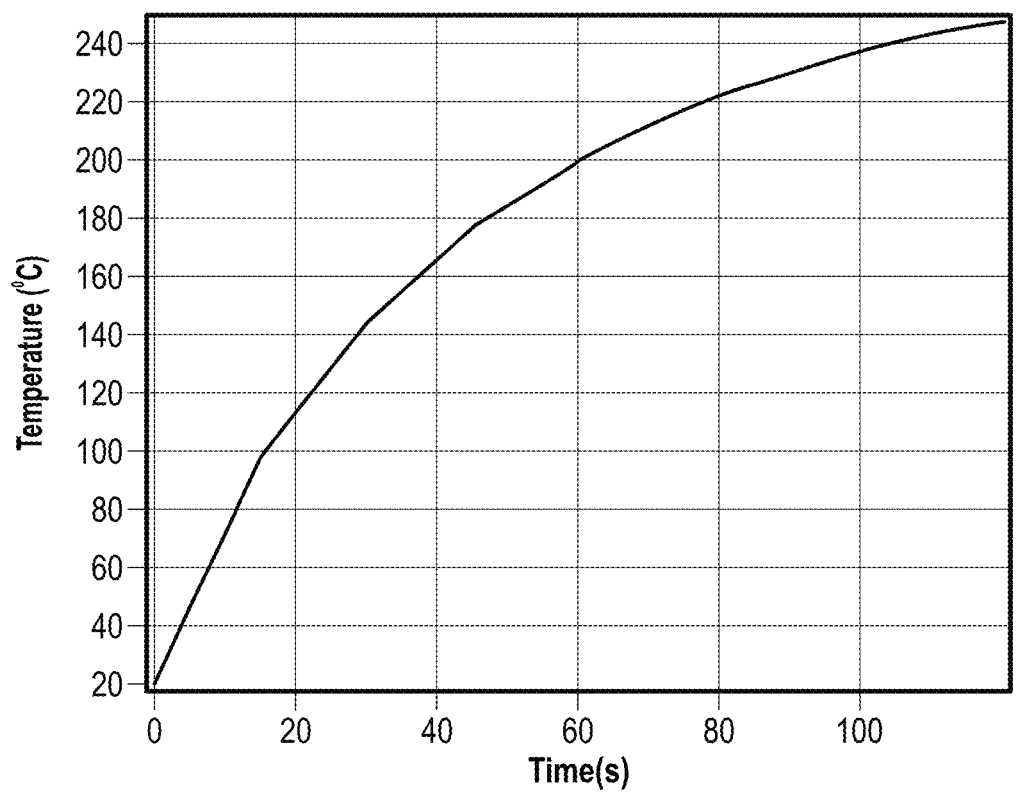
FIG. 8 illustrates COMSOL simulation results of maximum sample temperature as a function of time for unidirectional CF/epoxy heated through a fringing field capacitor at 25 W of input power at 66 MHz.

To develop a better understanding of the mechanism of RF energy transfer to pre-preg composites for heating, a finite element model was developed and solved that coupled the electromagnetic wave propagation and volumetric heating of the unidirectional pre-preg sample using COMSOL Multiphysics. The simulation geometry is comprised of two copper tape strips, a lumped port, and two perfect electrical connections to the source. The input power is assumed to be 25 W and the characteristic impedance of the system is 50Ω, which corresponds to a peak voltage of ~50 V. The geometric dimensions of the system and material parameters are provided in Table 1. The simulation results showed the electric field distribution and the thermal response of unidirectional CF/epoxy pre-preg after 120 seconds. A complete thermal response graph showing the maximum temperature as function of time is provided in FIG. 8.

It should be noted that unidirectional CF/epoxy is an orthotropic material, i.e., the material properties along the fiber direction (y-axis) are different from transverse direction (x & z-axis). This most notably affects the value of electrical conductivity in the sample which is orders of magnitude larger in the y-direction than in the x and z. As shown in FIG. 6A, the sample interferes with the orientation of the electric field and shows a significant decrease in strength near the sample, but due to the large conductivity in the y-direction, the amount of power dissipated into the sample for heating remains large. FIG. 6B confirms this phenomenon by showing a temperature increase of ~200° C. after 2 minutes of heating which coincides with the experimental results shown in FIG. 4A. Heating rates of ~70° C./s were observed in the simulations for 25 W input power.

Figure 9:
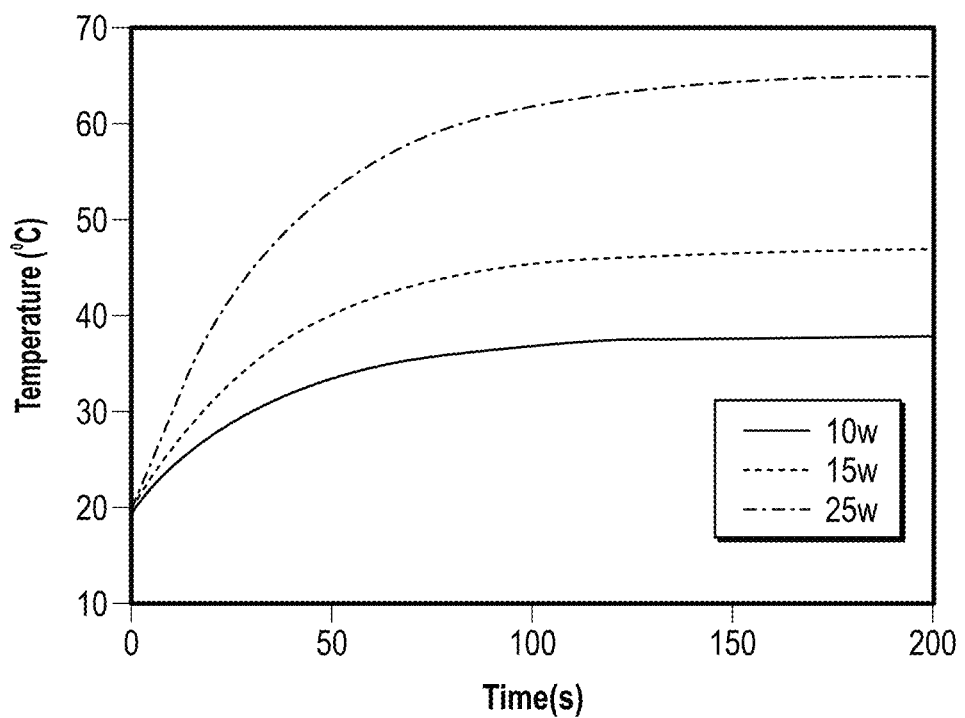
FIG. 9 illustrates COMSOL simulation results of maximum sample temperature as a function of time for plain weave CF/epoxy heated through a fringing field capacitor at 10 W, 15 W, and 25 W of input power at 66 MHz.

The thermal response of plain weave CF/epoxy to RF fields was also examined using COMSOL simulations. The material properties for the plain weave were assumed to be in-plane isotropic (electrical and thermal properties). Three different RF powers of 10 W, 15 W, and 25 W were applied to the sample at 66 MHz, with the thermal profile shown in FIG. 9. The temperatures achieved by the pre-preg were comparable to the experimental results, and uniform temperatures were observed in the simulated system.

These simulation results show that qualitative trends related to RF heating can be accurately captured using coupled physics models, and future modeling efforts can be used as predictive tools for gaining insight into a wider array of applicators and materials with varying electrical properties.

In some aspects, quality control can be increased in RF-aided heating methods. For instance, if a percentage of curing needs to changes or required imbedded fibers change, temperatures would also need to change. In a conventional method, an oven would need to be heated or cooled to a desired temperature, the pre-pregs would then be fabricated, and quality control would be performed on the pre-preg. In the case where the pre-preg is undesirable, time would be required for the oven to be cooled or heated to adjust the temperature of the oven. This process would need to be repeated until the desired pre-preg composition was fabricated.

The application of RF technology can be extended to second-generation nanocomposite pre-preg. These pre-pregs are highly toughened with carbon nanotubes or other nano-reinforcements along with carbon fibers as primary reinforcements. The combined heating response of carbon nanomaterials and carbon fiber to RF electromagnetic energy would provide a thermal response to RF. The RF-aided heating methods disclosed herein avoid the aforementioned quality control issues, as RF-aided heating methods have fine tunability, do not require long cool down periods similar to convection ovens, and can rapidly be tested for quality.

In some embodiments, the methods of the present disclosure include fabricating reinforced composites, such as, for example, fibers in a thermoset, nano-fillers in a thermoset, fibers and nano-fillers in a thermoset, or combinations thereof, that are susceptible to electromagnetic energy. Conductive fiber composites or nanocomposites can pass over a fringing field capacitor to heat and partially cure the thermoset. In some embodiments, the system is tuned for efficient coupling of the RF to the pre-preg. In some embodiments, the tuning can be achieved with frequency tuning, a matching network, hybrids of the two, and like. In some embodiments, the use of variable power, feed rate, and RF frequency are used to tailor pre-preg temperatures that further result in a variable degree of crosslinking of the thermoset. In some embodiments, the methods disclosed herein can be used in making pre-pregs with only carbon nanomaterials.

WORKING EXAMPLES

Reference will now be made to more specific embodiments of the present disclosure and data that provides support for such embodiments. However, it should be noted that the disclosure below is for illustrative purposes only and is not intended to limit the scope of the claimed subject matter in any way.

Figure 7:
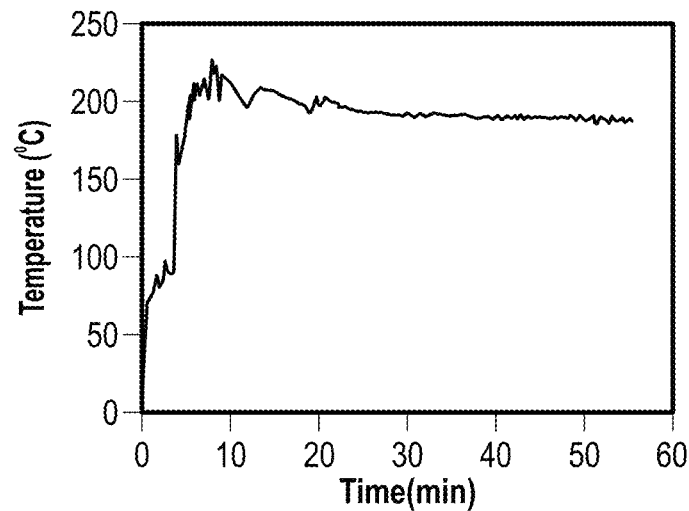
FIG. 7 illustrates temperature verses time of a pre-preg fabrication sample.

Pre-pregs can be manufactured using nanocomposites, such as, but not limited to nano-fillers in epoxy. 5 wt % CHEAP TUBES carbon nano tubes (CNTs) were dispersed in EPON862 (bisphenol F epoxide). The dispersion of the CNTs included a 1 hour bath sonication followed by 24 hours of magnetic stirring at 50° C. at 600 rpm. A curing agent added to 0.5 wt % EPON862 epoxide. A glass slide covered with a release agent and a ~1 mm wide resin was spread on a glass slide using a doctor blade. 50 W at 100 MHz was applied to the pre-preg fabrication sample. FIG. 7 illustrates temperature verses time of the pre-preg fabrication sample.

COMSOL Simulation

COMSOL Multiphysics 5.1 (COMSOL Inc. Los Angeles, CA) finite element software was used to simulate the radio frequency heating response of our carbon fiber/epoxy pre-preg. Using COMSOL's built-in physics, both the Electromagnetic Wave (Equation 1) and Heat Transfer in Solids (Equation 2) modules were solved simultaneously. The following two partial differential equations describe the system:

$$\nabla \times \mu_r^{-1}(\nabla \times E) - k_0^2 \left(e_r - \frac{j\sigma}{\omega e_0}\right) E = 0 \quad \text{Equation 1}$$

$$\rho C_P \frac{\partial T}{\partial t} + \nabla \cdot q = Q \ni q = -k\nabla T \quad \text{Equation 2}$$

Where $\mu_r$ is the relative permeability of the material, $e_r$ is the relative permittivity of the material, $k_o$ is the known wave number, $\sigma$ is the electric conductivity of the material, $\omega$ is the operating frequency, $\rho$ is the mass density, $C_p$ is the heat capacity, q is the heat flux, Q is the heat source (provided by the volumetric integral of the total power dissipation from the electric field in the carbon fiber/epoxy pre-preg), and k is the thermal conductivity.

In the Electromagnetic Wave module, the boundary conditions consisted of two perfect electric conductors for the connectors (Equation 3), one lumped port for the RF generator (Equation 4), a scattering condition for the far-field (Equation 5), and an electrical impedance condition (Equation 6) for the copper tape strips.

$$n \times E = 0 \quad \text{Equation 3}$$

$$Z = \frac{V_1}{I_1} \quad \text{Equation 4}$$

$$n \times (\nabla \times (E)) - jkn \times (E \times n) = 0 \quad \text{Equation 5}$$

$$\sqrt{\frac{\mu_0 \mu_r}{\epsilon_0 \epsilon_r - j\sigma/\omega}} \, n \times H + E - (n \cdot E)n = (n \cdot E_s)n - E_s \quad \text{Equation 6}$$

where n is the unit vector normal to the boundary, V is the applied peak-to-peak voltage, I is the current produced by the RF generator, k is the wave vector, H is the magnetic field, and $E_s$ is the surface electric field.

In the Heat Transfer module, the boundary conditions consisted of thermal insulation (Equation 7) along the bottom of the carbon fiber/epoxy pre-preg (assuming heat loss to the glass slide is minimal) and convective heat flux (Equation 8) at the surfaces of the carbon fiber/epoxy pre-preg exposed to the air.

$$-n \cdot q = 0 \quad \text{Equation 7}$$

$$-n \cdot q = h \cdot (T_{ext} - T) \quad \text{Equation 8}$$

where $T_{ext}$ is the ambient temperature and h is the heat transfer coefficient.

The model geometry was constructed using the same dimensions as the RF applicator and pre-preg specimen excluding the glass slide. The mesh for the model domain was built using tetrahedral elements and corresponded to ~1.6 million degrees of freedom. The material properties for the carbon fiber pre-preg and the geometry dimensions for the simulation are tabulated in Table 1. The built-in Frequency-Transient Study was utilized to solve the equations where data was recorded after 120 seconds of RF application.

TABLE 1

Material properties of carbon fiber/epoxy pre-preg and applicator used for COMSOL simulations.

| Property | | Value |
|---|---|---|
| Applicator Dimensions | Copper tape width | 6.35 mm |
| | Copper tape length | 220 mm |
| | Teflon substrate thickness | 6 mm |
| | Spacing between copper tapes | 2 mm |
| Electromagnetic Frequency | | 66 MHz |
| Electrical conductivity | Along fiber direction | 140 S/cm |
| | Perpendicular to fiber direction | 0.68 S/cm |
| | Thermal conductivity | [7.57E−04 T (° C.) + 5.6835E−01] W/m/K |

TABLE 1-continued

Material properties of carbon fiber/epoxy pre-preg and
applicator used for COMSOL simulations.

| Property | | Value |
|---|---|---|
| Heat capacity | Below (100° C.) | [3.692E−03 T (° C.) + 8.043E−01] J/g/K |
| | Above (100° C.) | [1.858E−03 T (° C.) + 1.172] J/g/K |
| Density | | 1555 kg/m$^3$ |
| Relative permeability | | 1 |

Figure 11:
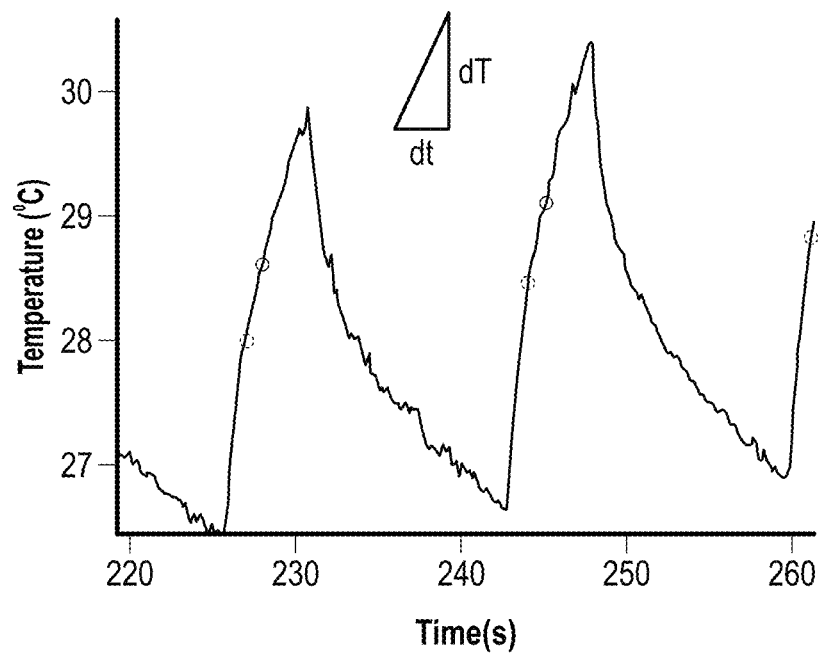
FIG. 11 illustrates the calculation of rate of change of temperatures for different frequencies.
Figure 12:
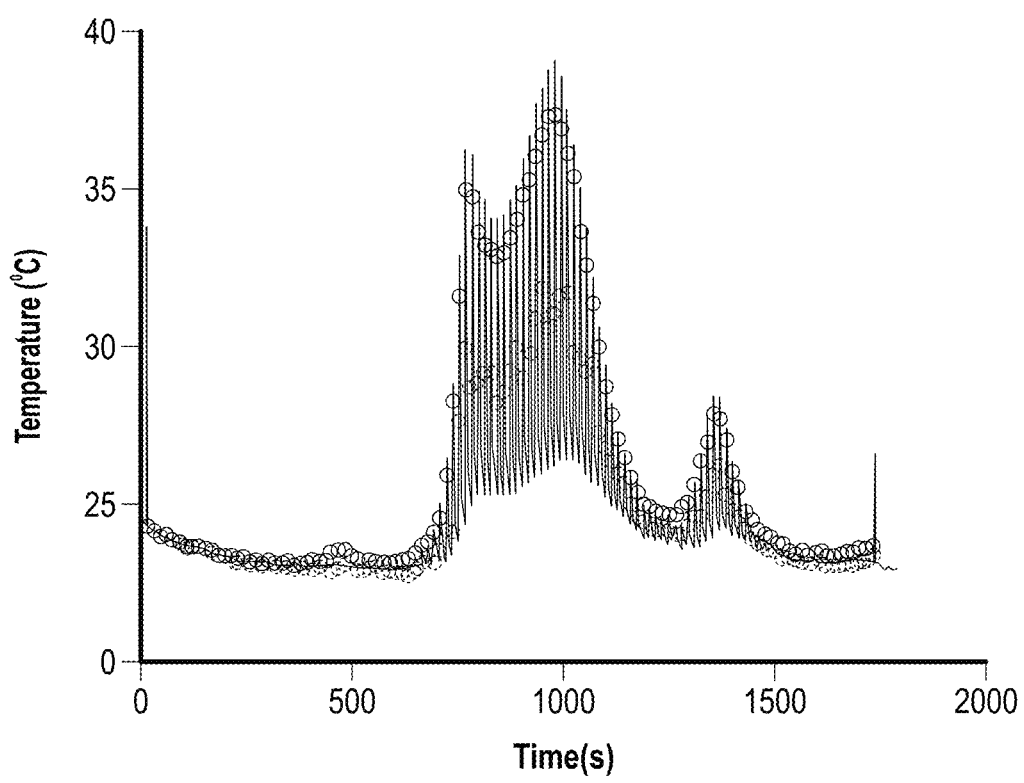
FIG. 12 illustrates temperature versus time data used for calculating dT/dt for unidirectional carbon fiber for different frequencies at 5 W input power.
Figure 13:
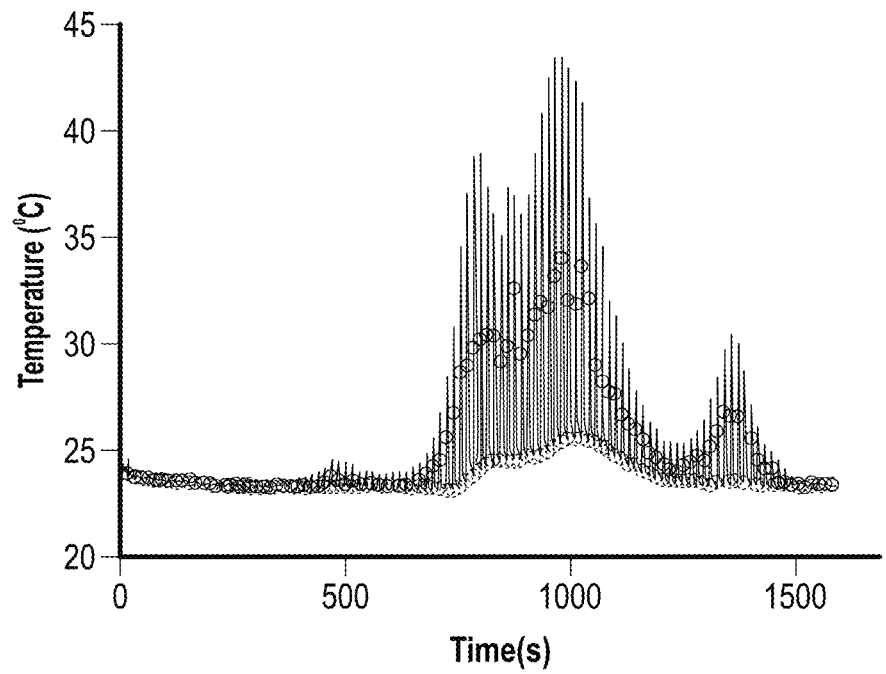
FIG. 13 illustrates temperature versus time data used for calculating dT/dt for [0/90] carbon fiber for different frequencies at 5 W input power.
Figure 14:
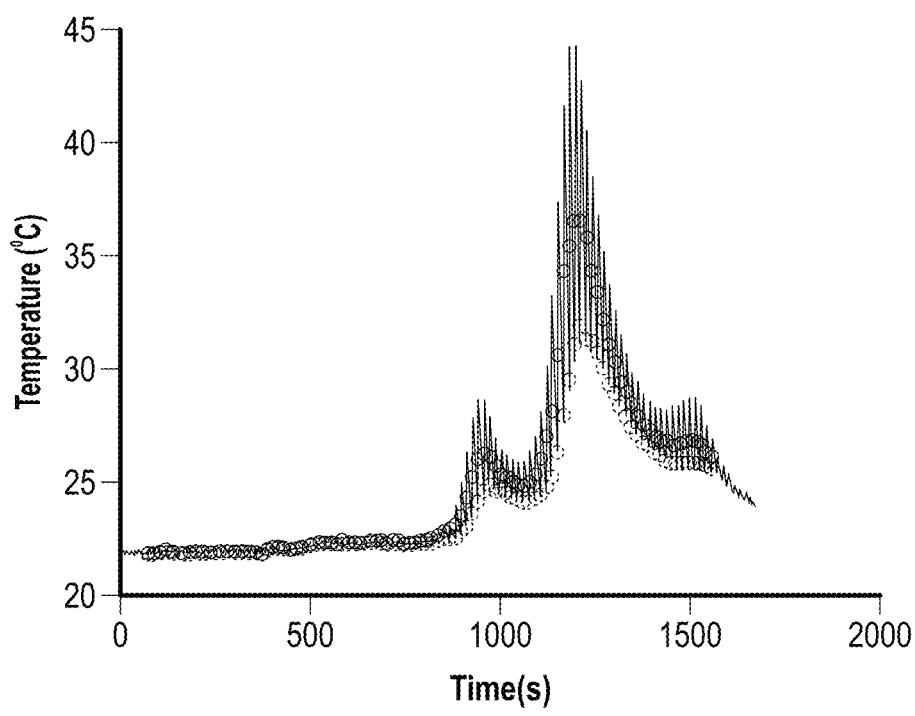
FIG. 14 illustrates temperature versus time data used for calculating dT/dt for CNT/epoxy for different frequencies at 5 W input power.

FIGS. 11-14 illustrate calculation of rate of change of temperature for different frequencies. FIG. 11 illustrates calculation of rate of change of temperature for different frequencies. FIG. 12 illustrates temperature-time data used for calculating dT/dt for unidirectional carbon fiber for different frequencies at 5 W input power. FIG. 13 illustrates temperature-time data used for calculating dT/dt for [0/90] carbon fiber for different frequencies at 5 W input power. FIG. 14 illustrates temperature-time data used for calculating dT/dt for CNT/epoxy for different frequencies at 5 W input power. The change in temperature and time between the lower circles on the plots and the upper circles on the plots were used to calculate the rate of heating in a particular frequency. A MATLAB script is used to calculate these changes a function of time, which further corresponds to a particular frequency.

The instant application discusses the RF response of three types of pre-pregs were examined, namely—unidirectional CF/epoxy, [0/90] CF/epoxy (plain weave) and CNT/epoxy. On exposing these composites to RF energy, it was found that these composites respond by an increment in temperature. It was found that heating rates up to 6° C./s can be achieved at 5 W of input power and this can be further augmented to 70° C./s at 25 W. The heating rates of carbonaceous pre-pregs can be amplified by increasing input power. The temperatures and the heating rates for CF/epoxy pre-preg observed experimentally and through finite element modeling were in close agreement. This provides a wide range of tailorability in term of heating the composites and partially curing them for future fabrication purposes. Further, we also demonstrated that the desired degree of curing can be achieved by controlled heating of pre-pregs up to a predefined temperature for a desired time. To simulate pre-preg production lines, we also demonstrated that pre-pregs can be heated and cured while translating over RF applicators. Multiple-arrays of RF applicators placed parallel to each other can be used to cover larger surface areas of pre-pregs in a roll-to-roll process.

The thermal response of the pre-pregs is dependent on the RF applicator geometry and frequency, electrical and thermal conductivity of the pre-pregs, as well as heat capacity and relative permeability. In this investigation, we used 5 wt % CNT-epoxy pre-pregs and 60 vol % carbon fiber-epoxy pre-pregs. By varying the concentration of fillers, the material properties of the pre-preg can be changed, thereby changing the thermal response to RF fields.

This technology can be easily implemented for the continuous fabrication of pre-pregs with carbonaceous fillers/inclusions such as continuous fibers, chopped fibers, or nanofibers or nanotubes. The flexibility for B-staging or curing the composites at different rates provides an edge over the state of art methods that employ large ovens that require longer residence time. This method can accelerate the speed of production of pre-pregs with tweakable parameters that can be used to manufacture composites with varying degree of cure. This method can also be extended to thermoplastic pre-pregs produced using the solution route.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A method of fabrication processing a pre-preg material, the method comprising:
    forming a pre-preg material by combining a fiber and a resin, wherein the resin comprises carbon nanotubes;
    partially curing the pre-preg material by applying electromagnetic heating to the pre-preg material, wherein the electromagnetic heating is conducted with at least one fringing field capacitor utilizing radio frequency (RF) alternating current (AC), the at least one fringing field capacitor comprising two parallel plate capacitors arranged such that the pre-preg material passes over the two parallel plate capacitors when the electromagnetic heating is applied; and
    controlling cross-linking of the resin in the extruded pre-preg material via the electromagnetic heating of the carbon nanotubes.

2. The method of claim 1, wherein the at least one fringing field capacitor is tuned to improve coupling of the RF to the fiber in the pre-preg material.

3. The method of claim 1, wherein the at least one fringing field capacitor is tuned to allow for partial curing of the resin.

4. The method of claim 1, wherein the at least one fringing field capacitor provides curing of the resin as a function of temperature.

5. The method of claim 1, wherein the fiber comprises at least one of a carbon fiber, a nano-filler, a graphite fiber, a glass fiber, and an aramid fiber.

6. The method of claim 1, wherein the resin is a thermoset resin.

7. The method of claim 6, wherein the thermoset resin is an epoxy resin.

8. The method of claim 1, wherein the pre-preg material further comprises a secondary filler.

9. The method of claim 8, wherein the at least one fringing field capacitor is tuned to improve coupling of the RF to the secondary filler in the pre-preg material.

10. The method of claim 1, wherein the controlling the cross-linking comprises tailoring temperature of the resin by controlling an amount of power input to the at least one fringing field capacitor.

11. The method of claim 1, wherein the resin is partially cured by the electromagnetic heating.

12. A method of fabrication processing a pre-preg material, the method comprising:

forming a pre-preg material by combining a fiber and a resin, wherein the resin comprises carbon nanotubes;

partially curing the pre-preg material by applying electromagnetic heating to the pre-preg material, wherein the electromagnetic heating is conducted with at least one fringing field capacitor utilizing radio frequency (RF) alternating current (AC), the at least one fringing field capacitor comprising two parallel plate capacitors arranged such that the pre-preg material passes over the two parallel plate capacitors when the electromagnetic heating is applied, and wherein the electromagnetic heating induces volumetric heating of the pre-preg material; and controlling cross-linking of the resin in the pre-preg material via the electromagnetic heating.

13. The method of claim 12, wherein the at least one fringing field capacitor is tuned to improve coupling of the RF to the fiber in the pre-preg material.

14. The method of claim 12, wherein the pre-preg material comprises polytetrafluoroethylene taping on at least one side of the pre-preg material.

15. The method of claim 12, wherein an amount of time the pre-preg material is exposed to the electromagnetic heating is controlled by a translation speed of a conveyor.

16. The method of claim 12, wherein the fiber comprises at least one of a carbon fiber, a nano-filler, a graphite fiber, a glass fiber, and an aramid fiber.

17. The method of claim 12, wherein the controlling the cross-linking comprises tailoring temperature of the resin by controlling an amount of power input to the at least one fringing field capacitor.

18. The method of claim 12, wherein the at least one fringing field capacitor is a parallel plate capacitor.

* * * * *